(12) United States Patent
Chen et al.

(10) Patent No.: US 11,593,826 B1
(45) Date of Patent: Feb. 28, 2023

(54) MESSAGING AND GAMING APPLICATIONS REWARDS

(71) Applicant: Snap Inc., Santa Monica, CA (US)

(72) Inventors: Dong Chen, Los Angeles, CA (US); Qiren Chen, Los Angeles, CA (US); John Jensen, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 364 days.

(21) Appl. No.: 16/422,063

(22) Filed: May 24, 2019

Related U.S. Application Data

(60) Provisional application No. 62/786,214, filed on Dec. 28, 2018.

(51) Int. Cl.
*G06Q 30/02* (2012.01)
*G06Q 30/0207* (2023.01)
(Continued)

(52) U.S. Cl.
CPC ......... *G06Q 30/0209* (2013.01); *A63F 13/73* (2014.09); *A63F 13/87* (2014.09); *H04L 51/04* (2013.01); *H04L 63/0853* (2013.01); *H04L 67/02* (2013.01); *H04L 67/131* (2022.05); *H04L 67/141* (2013.01); *H04L 67/146* (2013.01);
(Continued)

(58) Field of Classification Search
CPC ............... G06Q 30/0209; G06Q 30/02; G06Q 30/0254; G06Q 10/067; G06Q 30/0246; G06Q 30/0207; A63F 13/73; A63F 13/87; A63F 2300/532; A63F 2300/572; H04L 51/04; H04L 63/0853; H04L 67/02;
(Continued)

(56) References Cited

U.S. PATENT DOCUMENTS

| 8,239,487 B1* | 8/2012 | Hoffman | G06Q 50/10 |
| | | | 705/14.12 |
| 8,707,394 B2 | 4/2014 | Tam et al. | |
| | (Continued) | | |

FOREIGN PATENT DOCUMENTS

WO   WO 2011/041467 A2 *   4/2011   ............ A63F 13/06

OTHER PUBLICATIONS

C.E.Sharp; M. Rowe, Online game and e-business: Architecture for integrating business models and services into online games (English), IBM Systems Journal (vol. 45, Issue: 1, pp. 161-179), Jan. 1, 2006 (Year: 2006).*

(Continued)

*Primary Examiner* — Marilyn G Macasiano
(74) *Attorney, Agent, or Firm* — Schwegman Lundberg & Woessner, P.A.

(57) ABSTRACT

Aspects of the present disclosure involve a system comprising a computer-readable storage medium storing at least one program and a method for providing a platform that facilitates communication between a messaging application and a web-based gaming application; receiving, via the platform, a request from the web-based gaming application to execute a reward activity; determining, by the messaging application, that the request satisfies a reward activity criterion; generating the reward activity on the messaging application in response to receiving the request; and communicating, via the platform, a status of the reward activity from the messaging application to the web-based gaming application.

20 Claims, 9 Drawing Sheets

(51) Int. Cl.
*H04L 67/141* (2022.01)
*H04L 67/146* (2022.01)
*H04L 51/04* (2022.01)
*H04L 9/40* (2022.01)
*A63F 13/87* (2014.01)
*A63F 13/73* (2014.01)
*H04L 67/02* (2022.01)
*H04L 67/131* (2022.01)
*H04L 67/50* (2022.01)

(52) U.S. Cl.
CPC ...... *H04L 67/535* (2022.05); *A63F 2300/532* (2013.01); *A63F 2300/572* (2013.01)

(58) Field of Classification Search
CPC ... H04L 67/131; H04L 67/141; H04L 67/146; H04L 67/535
See application file for complete search history.

(56) References Cited

U.S. PATENT DOCUMENTS

| | | | | |
|---|---|---|---|---|
| 2013/0006736 | A1* | 1/2013 | Bethke | A63F 13/795 705/14.12 |
| 2013/0344932 | A1* | 12/2013 | Adams | G07F 17/3237 463/17 |
| 2014/0141864 | A1* | 5/2014 | Ward | G07F 17/34 463/25 |
| 2016/0012465 | A1* | 1/2016 | Sharp | G06Q 20/321 705/14.17 |
| 2016/0035178 | A1* | 2/2016 | Judkins | A63F 13/213 463/25 |
| 2016/0048250 | A1* | 2/2016 | Thakkar | A63F 13/31 463/31 |
| 2017/0076262 | A1* | 3/2017 | Xing | G06Q 30/0267 |
| 2017/0148267 | A1* | 5/2017 | Parker | G07F 17/323 |
| 2017/0316414 | A1 | 11/2017 | Doran et al. | |
| 2018/0013765 | A1* | 1/2018 | Brown | G06F 21/31 |
| 2018/0102018 | A1* | 4/2018 | Cage | G07F 17/329 |
| 2018/0300050 | A1* | 10/2018 | Mulcahy | G06F 3/03547 |
| 2018/0350144 | A1* | 12/2018 | Rathod | H04W 4/021 |
| 2018/0367483 | A1* | 12/2018 | Rodriguez | H04L 51/046 |

OTHER PUBLICATIONS

"U.S. Appl. No. 16/723,624, Non Final Office Action dated Nov. 12, 2021", 11 pgs.

"U.S. Appl. No. 16/723,624, Notice of Allowance dated Jun. 13, 2022", 10 pgs.

"U.S. Appl. No. 16/723,624, Response filed Feb. 9, 2022 to Non Final Office Action dated Nov. 12, 2021", 15 pgs.

Chang, Tao-Ku, "A secure operational model for mobile payments", TheScientificWorldJournal vol. 2014 (2014): 626243. doi:10.1155/2014/626243 (Year: 2014), [Online] Retrieved from the internet: <http://dx.doi.org/10.1155/2014/626243>, (2014), 14 pgs.

"U.S. Appl. No. 16/723,624, Notice of Allowance dated Oct. 6, 2022", 7 pgs.

"U.S. Appl. No. 16/723,624, Supplemental Notice of Allowability dated Oct. 18, 2022", 4 pgs.

* cited by examiner

MESSAGING AND GAMING APPLICATIONS REWARDS

CROSS-REFERENCE TO RELATED APPLICATION

This application claims the benefit of priority of Dong Chen et al., U.S. Provisional Patent Application No. 62/786,214, entitled "REWARDS AND VIRTUAL COMPENSATION IN SOCIAL NETWORKS." filed on Dec. 28, 2018, the entirety of which is hereby incorporated by reference herein.

TECHNICAL FIELD

The present disclosure relates generally to a software development kit (SDK), and more particularly to facilitating interactions between messaging and gaming applications using the SDK.

BACKGROUND

The popularity of users interacting with other users online continues to grow. There are many ways for users to interact online with other users. Users can communicate with their friends using messaging applications and can play with other users online in multiplayer video games. However, there remains a disconnect between the people the user communicates with using the messaging applications and the people the user plays with in the multiplayer video games. In particular, a user typically has to leave a certain video game the user is playing to communicate with the user's friends through the messaging application, and the user has to leave a conversation the user is having in the messaging application to play the video game.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
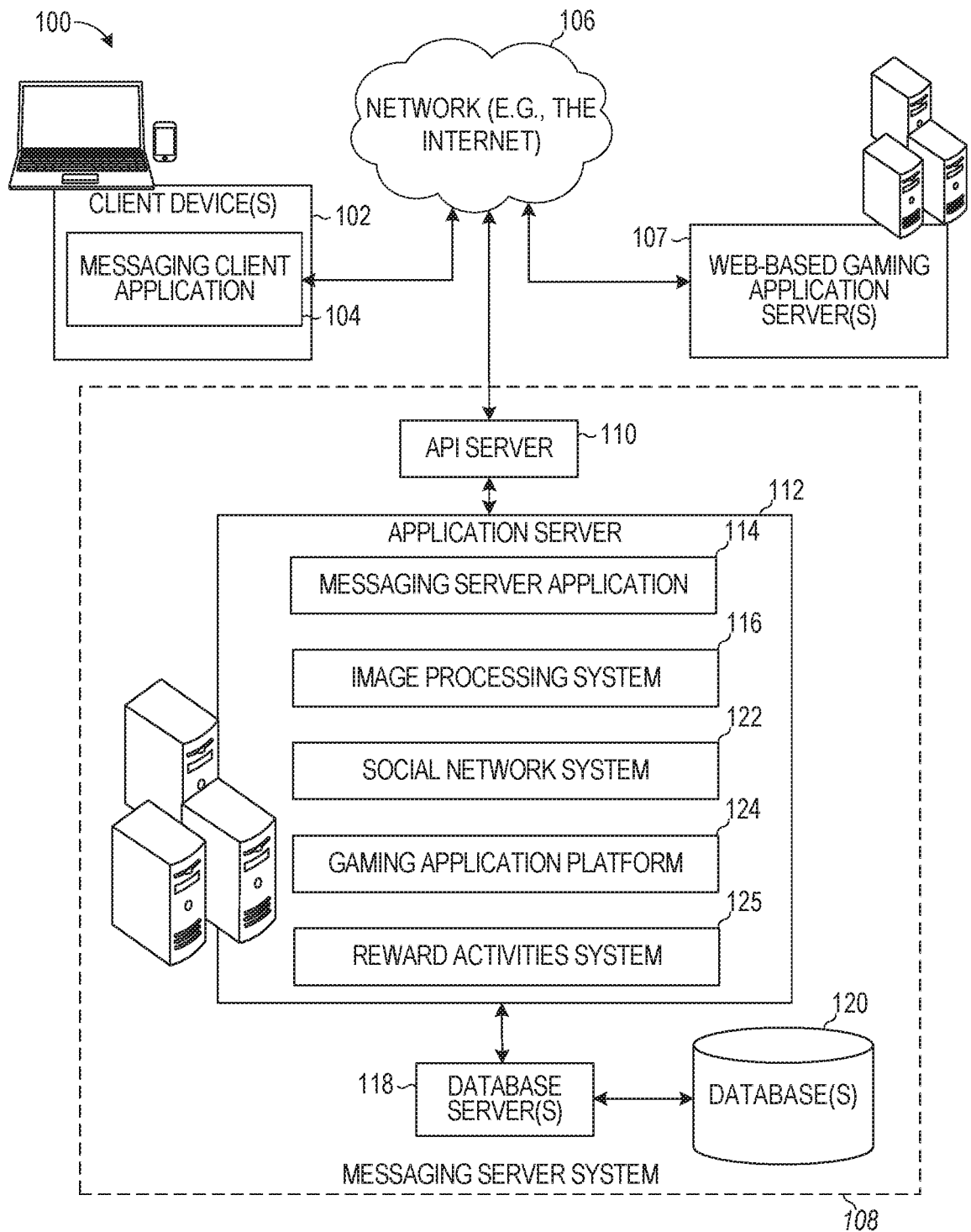
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Often, users utilize a messaging application to talk to their friends and a multiplayer video game to play with some known or unknown group of users (a group that may not include their friends from the messaging application). This leaves the users having to choose whether to talk to their friends on the messaging application or play with strangers in a video game application. In addition, while certain video game applications allow the user to chat with other users in the video game application, such chatting is limited to the users of the video game application (which may not include the user's friends on the messaging application) and has to be performed through the graphical user interface (GUI) of the video game application. Chatting through the GUI of the video game application typically results in poor user experience because the GUI of the gaming application is not only unfamiliar to the user but may also have limited, reduced, and different functionality compared to that of the messaging application GUI. The disclosed embodiments improve the functionality of electronic messaging software and systems, and of web-based gaming application software and systems, by providing a platform for facilitating communication between the messaging software and systems and the web-based gaming application software and systems for integrating functions of the messaging application into the web-based gaming application.

By providing a platform that facilitates communication between the messaging application and the web-based gaming application, according to certain embodiments, the web-based gaming application can securely obtain user data and generate reward activities using data from the messaging application to enable the user to, for example purchase or otherwise obtain enhancements in the web-based gaming application, or choose which friends from the messaging application the user would like to play the game with. Using the platform, only the information necessary for the user to play a game with friends from the messaging application is provided by the messaging application to the gaming application. For example, features of the GUI of the messaging application, such as conversation size, chat color, avatar information, etc., are provided to and integrated into the gaming application.

The disclosed embodiments provide an ability for a user to generate rewards, such as obtaining or spending virtual currency, within their social networking account or messaging application by voluntarily participating in certain reward activities within an environment of the social network, such as watching reward videos. Upon completion of these activities, the user may be rewarded with virtual currency which may then be used to continue participation in their favored activities, such as a web-based gaming application. For example, the user may wish to participate in a game provided by the social network. More specifically, the user may wish to obtain certain features or tools within the game. These features or tools may, in some embodiments, be purchased by the user by an exchange and provision of virtual currency to the gaming application that is managed by the messaging application. As an example, the gaming application may provide the user the features or tools if the messaging application indicates to the gaming application that the user has consumed a reward video or reward content.

The disclosed embodiments provide two levels of security for handling the reward activities and exchange of rewards or data associated with the reward activities between the messaging application and the web-based gaming application. In a first level, the messaging application determines whether a particular request for reward activity, such as a request for obtaining a certain amount of virtual currency, satisfies a reward criterion for the web-based gaming application. In a second level, when the web-based gaming application receives an indication of successful completion of the reward activity, the web-based gaming application verifies that a unique identifier of the request matches an expected unique identifier that is stored on a remote database. In this way, the disclosed embodiments ensure that the messaging application is receiving and processing authorized requests for reward activities and that the web-based gaming application is receiving and processing authorized reward activity completions. By utilizing the messaging application platform, according to the disclosed embodiments, to exchange virtual currency with the gaming application (or the indication that certain activities, such as reward activities, were completed with the messaging application), the security and integrity of communicating such transactions can be maintained.

Particularly, the disclosed embodiments prevent surreptitious use of and interference with the virtual currency exchange and the exchange of information indicating completion of messaging application activities, such as reward-related activities. This is done by the gaming application utilizing certain unique tokens, which are predetermined, in requesting virtual currency and/or the indications of completion of reward activities from the messaging application. The gaming application may further utilize an external source of information, such as a remote database, to verify that the provided indication from the messaging application satisfies certain expected criteria. In this way, the disclosed embodiments prevent tampering with the reward system and virtual currency system that are utilized by the messaging and gaming applications.

FIG. 1 is a block diagram showing an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via the network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

Each messaging client application 104 is also able to communicate with one or more web-based gaming application servers 107. Each web-based gaming application server 107 hosts, for example, an HTML5-based game. Particularly, the messaging client application 104 launches a web-based game by accessing the HTML5 file from the web-based gaming application server 107 associated with the game. In certain embodiments, the games hosted by the web-based gaming application server 107 are programmed in JavaScript leveraging an SDK stored on a gaming application platform 124 provided by the messaging server system 108. The SDK includes application programming interfaces (APIs) with functions that can be called or invoked by the web-based gaming application. In certain embodiments, the gaming application platform 124 includes a JavaScript library that provides a given gaming application access to certain user data of the messaging client application 104. HTML5 is used as an example technology for programming games, according to some embodiments, but games programmed based on other technologies can be used.

In order to integrate the functions of the SDK into the game, the SDK is downloaded by the web-based gaming application server 107 from the messaging server system 108 or is otherwise received by the web-based gaming application server 107. Once downloaded or received, the SDK is included as part of the application code of the web-based game. The code of the web-based game can then call or invoke certain functions of the SDK to integrate features of the messaging client application 104 into the web-based gaming application. Some of the functions and functionality of the SDK which the web-based gaming application can call are discussed in detail below in connection with FIGS. 4-7.

The SDK stored on the gaming application platform 124 effectively provides the bridge between the web-based gaming application and the messaging client application 104. This provides the user with a seamless experience of communicating with their friends on the messaging client application 104, preserving the look and feel of the messaging client application 104, while playing a web-based gaming application. To bridge the web-based gaming application and the messaging client application 104, in certain embodiments, the SDK facilitates communication between the web-based gaming application server 107 and the messaging client application 104. In certain embodiments, a WebViewJavaScriptBridge running on a client device 102 establishes two one-way communication channels between the web-based gaming application and the messaging client application 104. Messages are sent between the web-based gaming application and the messaging client application 104 via these communication channels asynchronously. Each SDK function invocation is sent as a message, and callback for each SDK function is implemented by constructing a unique callback identifier and sending a message with that callback identifier.

By utilizing the SDK, not all of the information from the messaging client application 104 is shared with the web-based gaming application server 107. The SDK limits which information is shared based on the needs of the web-based gaming application and based on a context from which the web-based gaming application was launched by the messaging client application 104.

In certain embodiments, each web-based gaming application server 107 provides the HTML5 file corresponding to the web-based gaming application to the messaging server system 108. The messaging server system 108 can add a visual representation of the game in the messaging client application 104. Once the user selects the visual representation or instructs the messaging client application 104 through a GUI of the messaging client application 104 to launch the game, the messaging client application 104 obtains the HTML5 file and initiates all the resources necessary to launch the game. In some cases, the messaging client application 104 accesses the corresponding web-based gaming application server 107 to launch the game.

The HTML5 file corresponding to the web-based gaming application may include a unique identifier of the web-based gaming application. The HTML5 file may also include reward activity-related information. Specifically, the HTML5 file may include identifiers of various stages or levels in the web-based gaming application. For each stage or level, the HTML5 file may specify one or more types of reward activities that are available. The reward activities that are available may include different amounts of virtual currency a user can spend in each stage or level. For example, at level 1 of the web-based gaming application, the user may be offered the opportunity to purchase various virtual goods, each at a different virtual price. Specifically, one virtual good may be priced at 100 coins, a second virtual good may be priced at 152 coins, and a third virtual good may be priced at 257 coins. The HTML5 file may include an association between a given level (e.g., level 1) and the range of available reward activities (e.g., 100 coins, 152, coins, and 257 coins, or minimum and maximum coin values ranging from 100 coins to 260 coins). In some cases, the reward activities may include one or more video rewards a user can view or other types of reward activities. In such cases, the HTML5 file may associate the given level with the number and types of available reward activities (e.g., level 5 may be associated with three reward videos). The unique identifier of the web-based gaming application and the association between different levels or stages in the game and the corresponding available rewards may be stored in a database 120 accessible to the gaming application platform 124.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples.

Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to the database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 and the web-based gaming application server 107 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114, for possible access by another messaging client application 104; the setting of a collection of media data (e.g., story); the retrieval of such collections; the retrieval of a list of friends of a user of a client device 102; the retrieval of messages and content; the adding of friends to and deleting of friends from a social graph; the location of friends within a social graph; access to reward activities and/or virtual currency stored on a reward activities system 125; access to user conversation data; access to avatar information stored on the messaging server system 108; access to authentication tokens; access to a leaderboard; access to game score information; and opening an application event (e.g., relating to the messaging client application 104).

The application server 112 hosts a number of applications and subsystems, including the messaging server application 114, an image processing system 116, a social network system 122, the gaming application platform 124, and the reward activities system 125. The messaging server application 114 implements a number of message processing technologies and functions, particularly related to the aggregation and other processing of content (e.g., textual and multimedia content) included in messages received from multiple instances of the messaging client application 104. As will be described in further detail, the textual and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with whom a particular user has relationships or whom the particular user is "following." and also the identification of other entities and interests of a particular user. Such other users may be referred to as the user's friends.

The reward activities system 125 stores multiple advertisements. These advertisements may include a collection of video clips (e.g., 30-40 second video clips). A given web-based gaming application can use the advertisements stored on the reward activities system 125 to provide a reward to a user in the web-based gaming application. For example, a user can be provided with the option to watch a given advertisement in the video game to advance a level, to upgrade armor or weapons, to increase a score, or to purchase game content. The reward activities system 125 can include a collection of profiles for each user of the messaging server system 108. Based on the profiles, the reward activities system 125 can select advertisements suitable for or that may interest a given user. The reward activities system 125 may also keep track of which advertisements each user of the messaging server system 108 has watched to avoid presenting the same advertisements multiple times to the same user. Leveraging the reward activities system 125 managed by the messaging server system 108 avoids the web-based gaming application server 107 having to obtain and manage its own advertisements. The manner in which reward videos are provided to a given player in the web-based gaming application using the reward activities system 125 is discussed in more detail below in connection with FIG. 6.

The reward activities system 125 also stores a virtual wallet that maintains a virtual currency balance for a given user to spend across different gaming applications. A given web-based gaming application can access the virtual wallet stored on the reward activities system 125 to allow a user to purchase virtual or tangible items in the web-based gaming application. For example, a user can be provided with the option to purchase a given item in the video game to advance a level, to upgrade armor or weapons, to increase a score, or to purchase game content for a given virtual currency amount. If the user elects to purchase the item in the web-based gaming application, the web-based gaming application transmits a message, via the API of the gaming application platform 124, to the reward activities system 125 requesting that the specified amount of virtual currency associated with purchase of the item be deducted from the virtual wallet. The message may uniquely identify the web-based gaming application, the level or stage within the gaming application from which the item is being purchased, and the amount of the item being purchased. The reward activities system 125 may process the message, and retrieve from the database 120 the reward activity type ranges associated with the gaming application and level. The reward activities system 125 determines whether the requested amount in the message is within or satisfies the retrieved range associated with the particular level.

In response to determining that the requested amount in the message is within or satisfies the retrieved range associated with the particular level (e.g., the requested amount satisfies a reward activity criterion), the reward activities system 125 completes the request. For example, the reward activities system 125 may deduct the specified amount of virtual currency from the virtual wallet maintained by the reward activities system 125. The reward activities system 125 provides status information back to the web-based gaming application indicating whether or not the reward activity was successfully completed (e.g., whether the virtual funds were successfully deducted). The status information may include a unique identifier associated with the web-based gaming application. The web-based gaming application may access the database 120 to obtain the expected unique identifier and compare the expected unique identifier with the identifier received in the status information. In response to determining that the identifiers match each other or correspond in an expected way, the web-based gaming application may complete the purchase of the goods and provide the user with the item being requested in the web-based gaming application. If the requested amount does not satisfy the range associated with the particular level, the status information provided by the reward activities system 125 to the web-based gaming application may indicate that the request failed to satisfy the reward activity criterion.

In some embodiments, a given web-based gaming application can access a reward video, a reward survey, a reward image, or reward text stored on the reward activities system 125 to allow a user to purchase virtual or tangible items in the web-based gaming application. For example, a user can be provided with the option to gain a certain quantity of virtual tokens or currency in the web-based gaming application, which the user can use to purchase a given item in the video game to advance a level, to upgrade armor or weapons, to increase a score, or to purchase game content. The web-based gaming application may provide the user with access to the certain quantity of virtual tokens or currency in the web-based gaming application if the user completes consumption of a reward video, a reward survey, a reward image, or reward text. If the user elects to complete consumption of the reward video, the reward survey, the reward image, or the reward text in the web-based gaming application, the web-based gaming application transmits a message, via the API of the gaming application platform 124, to the reward activities system 125 requesting that the reward video, the reward survey, the reward image, or the reward text be provided to the user. The message may uniquely identify the web-based gaming application, the level or stage within the gaming application from which the item is being purchased, and the type of reward activity being requested (e.g., consumption of a reward video, a reward survey, a reward image, or a reward text). The reward activities system 125 may process the message, and retrieve from the database 120 the reward activity type ranges associated with the gaming application and level. The reward activities system 125 determines whether the requested reward activity in the message is within or satisfies the retrieved range associated with the particular level.

In response to determining that the requested activity in the message is within or satisfies the retrieved range associated with the particular level (e.g., the requested activity satisfies a reward activity criterion), the reward activities system 125 completes the request. For example, the reward activities system 125 may present the user the reward video, the reward survey, the reward image, or the reward text. The reward activities system 125 provides status information back to the web-based gaming application indicating whether or not the reward activity was successfully completed (e.g., whether the reward video was viewed to completion). Specifically, the reward activities system 125 monitors user input during the presentation or provision of the reward activity. For example, the user input can be monitored to determine whether the user cancels the reward activity (e.g., by stopping the presentation of the reward video or exiting the reward survey early), skips the reward activity, or iconizes a window displaying the reward activity. Based on the monitored user input, the reward activities system 125 determines whether the reward was successfully completed (e.g., whether the reward video was viewed from start to finish uninterrupted). If monitoring the user input indicates that the reward activity was not successfully completed or if the requested activity does not satisfy the range associated with the particular level, the status information provided by the reward activities system 125 to the web-based gaming application may indicate that the request failed to satisfy the reward activity criterion.

The status information may include a unique identifier associated with the web-based gaming application. The web-based gaming application may access the database 120 to obtain the expected unique identifier and compare the expected unique identifier with the identifier received in the status information. In response to determining that the identifiers match each other or correspond in an expected way, the web-based gaming application may provide the user the certain quantity of virtual tokens or currency or item associated with the reward activity.

The reward activities system 125 implements a reward system for users of the social network system 122. The reward system may provide for a user of the social network system 122 to perform one or more voluntary actions that may provide compensation to the user. The voluntary actions may include, for example, watching a video, viewing an image, reading some text, and/or taking a survey.

In some embodiments, prior to launching a game with in-application purchase capability, a game developer may be required to register and configure goods to be purchased within the game using an Inventory Management System (IMS). For each sellable item, a developer needs to specify the following attributes: an enabled/disabled indication that controls whether the item is currently available for sale; an icon asset indication, which provides an icon to be used in game and checkout flow; a title to be used in game and checkout flow; a short description to be used in game and checkout flow; an item identifier to be used in game and checkout; a price tier indication, which defines a pricing tier, with fixed localization of pricing by country; a countries enabled indication, which indicates which countries are enabled or disabled for the item; localized languages (per language), including localization options for a predefined list of supported languages; a language-specific translated title for a selected language to be used in game and checkout flow; a country-specific description for a selected language to be used in game and checkout flow; and an item version number, which increments with every update to a mutable field. If no localized languages are provided, the default will be the base title and description provided. Any one or combination of these attributes can be utilized as a reward activity criterion to determine whether a given reward activity request received from a web-based gaming application satisfies the predetermined reward criterion. Namely, the reward activities system 125 may receive a reward activity request from the web-based gaming application and may compare the specified reward activity in the request with any one or combination of the attributes previously specified by the developer. If the specified reward activity matches or satisfies the one or combination of attributes, the reward activities system 125 may complete or provide the requested reward activity.

In some embodiments, the reward activities system 125 includes a reward identification component, a reward execution component, a reward granting component, and a selective enablement component. The reward identification component identifies one or more rewards that a user is eligible to participate in (e.g., that meet the predetermined reward criterion provided by the game developer for each level or stage in the game). The reward execution component generates the reward activity (e.g., deducts funds from a virtual wallet and/or presents a reward video to the user). For example, if the reward is achieved via watching a video, the reward execution component plays the video. If the reward is achieved via taking a survey, the reward execution component provides the survey to the user and collects the responses. The reward granting component grants a reward at the completion of the reward activity. The reward may be in the form of virtual or actual currency. The reward may alternatively be in the form of selective enablement of one or more features of the web-based gaming application. The selective enablement component provides for selective enablement of features of the web-based gaming application based on a reward granted to the web-based gaming application or the user.

Figure 2:
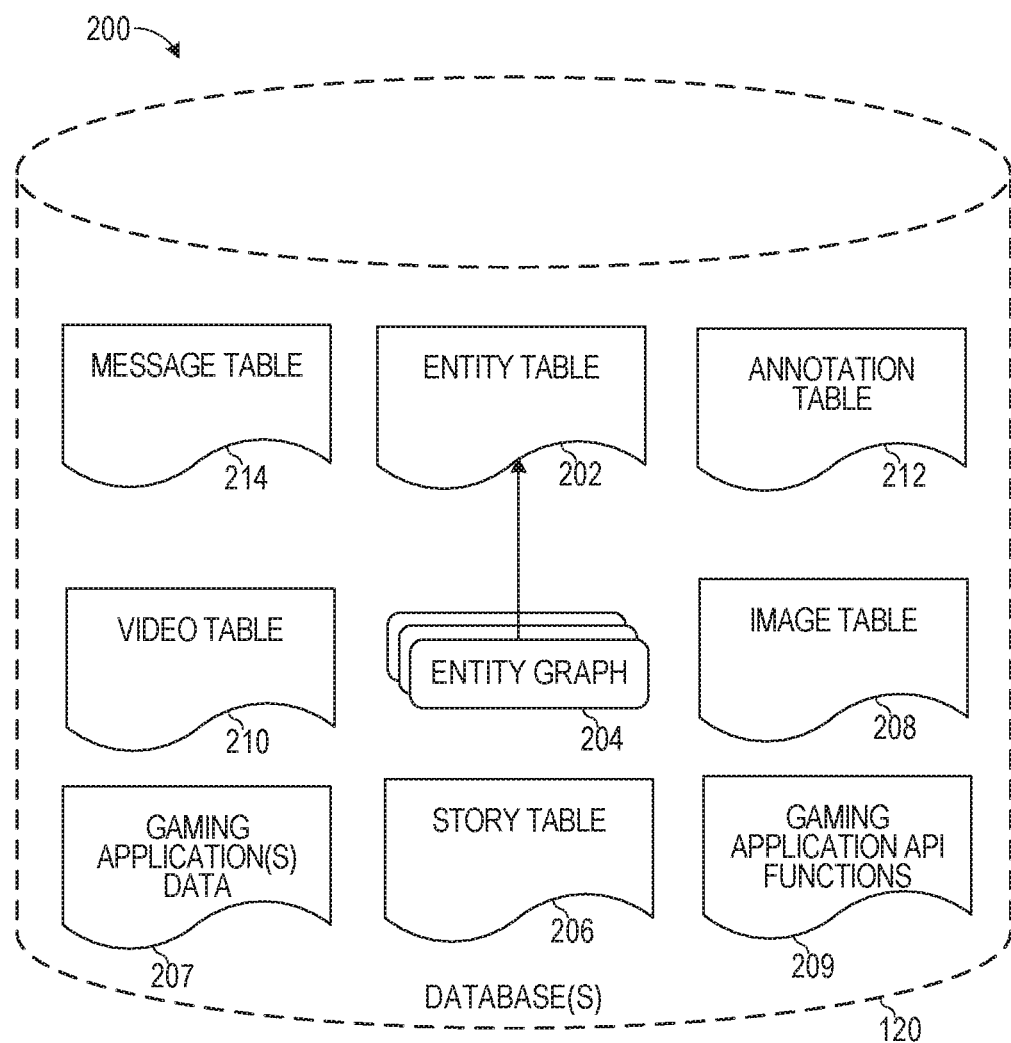
FIG. 2 is a schematic diagram illustrating data which may be stored in a database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

The message table 214 may store a collection of conversations between a user and one or more friends or entities. The message table 214 may include various attributes of each conversation, such as the list of participants, the size of the conversation (e.g., number of users and/or number of messages), the chat color of the conversation, a unique identifier for the conversation, and any other conversation-related feature(s). Information from the message table 214 may be provided in limited form and on a limited basis to a given web-based gaming application based on functions of the messaging client application 104 invoked by the web-based gaming application.

The database 120 also stores annotation data, in the example form of filters, in an annotation table 212. The database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the annotation table 212 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the message table 214. The entity table 202 may associate various annotations from the annotation table 212 with various images and videos stored in the image table 208 and the video table 210.

Gaming application(s) data 207 stores gaming information associated with one or more web-based gaming applications. Such gaming information may include a visual representation or icon of the given web-based game. Such a visual representation is used by the messaging application to identify the game and allow the user to select the visual representation to launch the game. The gaming information may include information identifying the maximum number of players a given game can host. This information is used by the messaging application to determine whether a game launched from a given conversation having a certain number of participants can support all of the participants of the conversation. The gaming information may include score information for each game. Such score information can be used by the messaging application to manage and maintain a leaderboard that is specific to each game and/or that is geographically relevant. Namely, the leaderboard can represent leaders of the web-based game among a group of users in a particular geographical location or across the entire list of users of the messaging application. A leader represents a user with a higher score than another user, though other attributes can be used to define a leader (e.g., a user who plays a game for more time than another user).

Gaming information stored in the gaming application(s) data 207 may include unique identifiers of each web-based gaming application. The unique identifiers may be associated with one or more levels or stages in each corresponding web-based gaming application. For each level or stage in the web-based gaming application, a list or range of activity types is included in the gaming application(s) data 207. Namely, gaming information stored in the gaming application(s) data 207 may include a reward activity criterion or criteria specified in a predetermined manner by a game developer for each game and for each stage or level in the game. This data is used by the reward activities system 125 to determine whether parameters (e.g., unique game identifier, stage or level, and activity type or virtual funds amount) specified in a reward activity request received from a web-based gaming application satisfy the reward criterion before the reward activity is executed or completed. Gaming information stored in the gaming application(s) data 207 may also include expected unique identifiers for each game receiving confirmation that a reward activity request was successfully completed. A web-based gaming application may receive confirmation from the reward activities system 125 that a reward activity was successfully completed. In response, the web-based gaming application may compare a unique identifier provided in the confirmation message with the expected unique identifier stored in the gaming application(s) data 207 for the web-based gaming application.

Gaming application API functions 209 stores a number of functions of the SDK stored on the gaming application platform 124. The gaming application API functions 209 stores the code that is executed when a given function of the API is invoked by the web-based gaming application or the messaging client application 104. Such API functions can include:

A function to initialize the web-based gaming application.

A function to set a volume of the web-based gaming application.

A function to provide an authentication token to the web-based gaming application.

A loading progress function which indicates to the messaging application the loading progress of the web-based game.

A loading complete function which indicates to the messaging application that loading of the web-based game has completed.

A fetch avatar image function which is used by the web-based gaming application to obtain an avatar matching a given user's identification.

A play with friends function to allow a user to select friends of the user on the messaging application to play with using the look and feel of the messaging application.

Reward activity-related functions to retrieve advertisements from the reward activities system 125 and track whether the user completed watching the given advertisements or performing the reward activity.

A leaderboard function to allow the web-based game to retrieve the leaderboard from the gaming application(s) data 207 to present to the user.

A submit score to leaderboard function to allow the web-based game to send to the messaging application score information for a given user to be updated in the leaderboard stored in the gaming application(s) data 207.

An add/remove user function to allow the messaging application to add users to or remove users from the web-based gaming application.

A focus function to allow the messaging application to inform the web-based gaming application whether the user has lost/regained focus in the game so that the game knows the user is or is not active in the game and whether the user can or cannot interact with the game directly.

A story table 206 stores data regarding collections of messages and associated image, video, or audio data, which are compiled into a collection (e.g., a story or a gallery). The creation of a particular collection may be initiated by a particular user (e.g., each user for whom a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story. The UI of the messaging client application 104 may include selectable options to enable a sending user to add a modified video clip that has a virtual object to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a UI of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
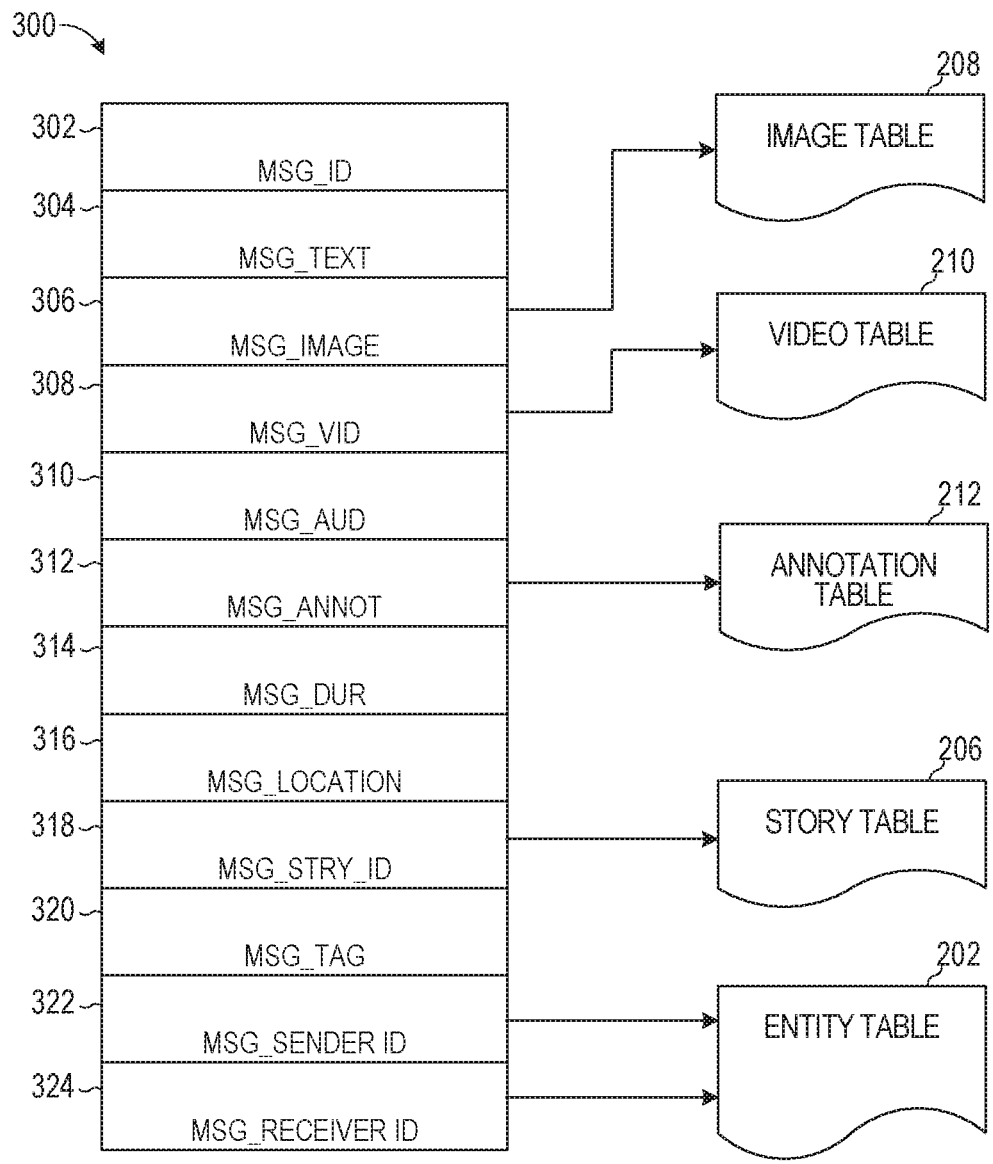
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104, the messaging server application 114, or the web-based gaming application server 107 (e.g., in response to functions being invoked in the API). The content of a particular message 300 is used to populate the message table 214 stored within the database 120, accessible by the messaging server application 114. Similarly, the content of a message 300 is stored in memory as "in-transit" or "in-flight" data of the client device 102, the web-based gaming application server 107, or the application server 112. The message 300 is shown to include the following components:

A message identifier 302: a unique identifier that identifies the message 300.

A message text payload 304: text, to be generated by a user via a UI of the client device 102 and that is included in the message 300, or identifying a given API function and data associated with its parameters.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to the message image payload 306, message video payload 308, or message audio payload 310 of the message 300.

A message duration parameter 314: parameter value indicating, in seconds, the amount of time for which content of the message 300 (e.g., the message image payload 306, message video payload 308, and message audio payload 310) is to be presented or made accessible to a user via the messaging client application 104.

A message geolocation parameter 316: geolocation data (e.g., latitudinal and longitudinal coordinates) associated with the content payload of the message 300. Multiple message geolocation parameter 316 values may be included in the payload, with each of these parameter values being associated with respective content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of one or more users of the client device 102 to whom the message 300 is addressed. In the case of a conversation between multiple users, the identifier may indicate each user involved in the conversation.

The contents (e.g., values) of the various components of the message 300 may be pointers to locations in tables within which content data values are stored. For example, an image value in the message image payload 306 may be a pointer to (or address of) a location within the image table 208. Similarly, values within the message video payload 308 may point to data stored within the video table 210, values stored within the message annotations 312 may point to data stored in the annotation table 212, values stored within the message story identifier 318 may point to data stored in the story table 206, and values stored within the message sender identifier 322 and the message receiver identifier 324 may point to user records stored within the entity table 202.

Figure 4:
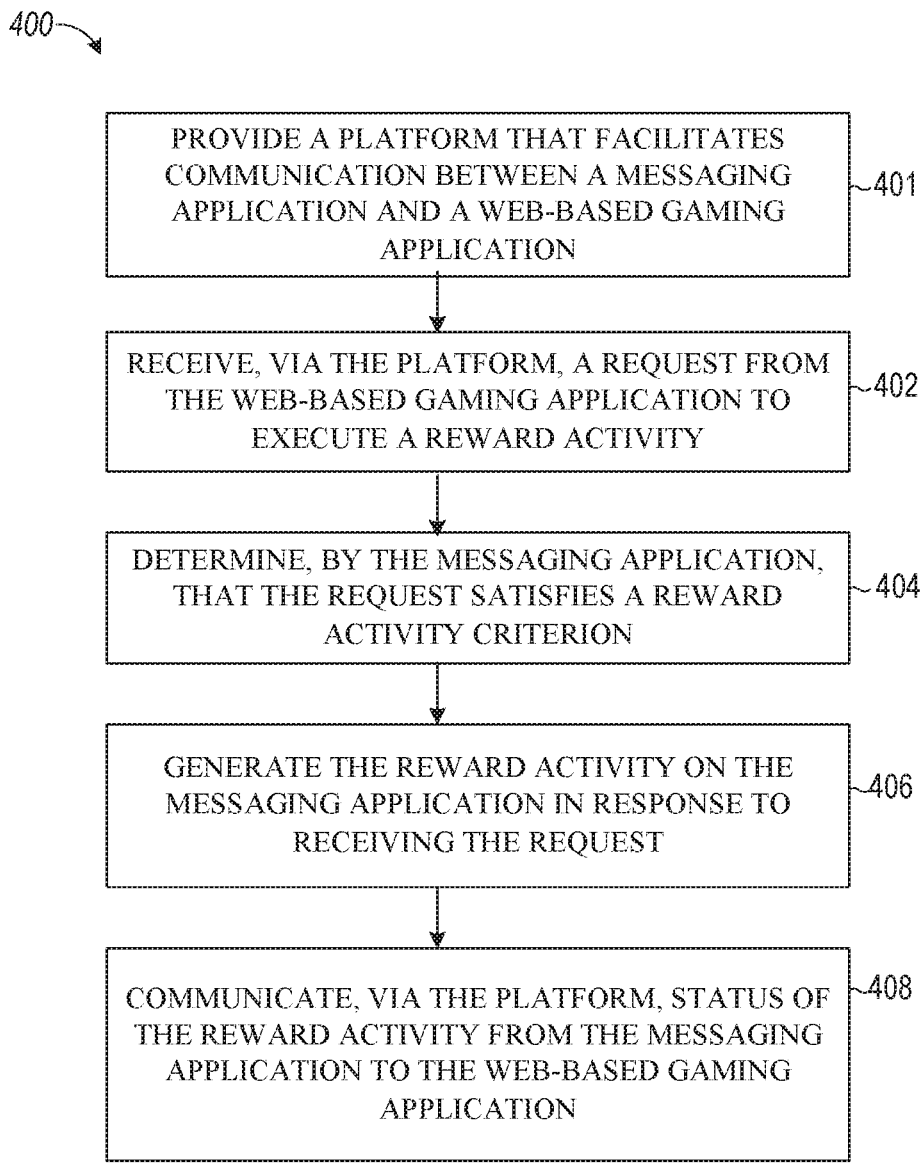
FIGS. 4-6 are flowcharts illustrating example operations of a gaming application platform in performing processes for facilitating interactions between a messaging application and a web-based gaming application, according to example embodiments.
Figure 5:
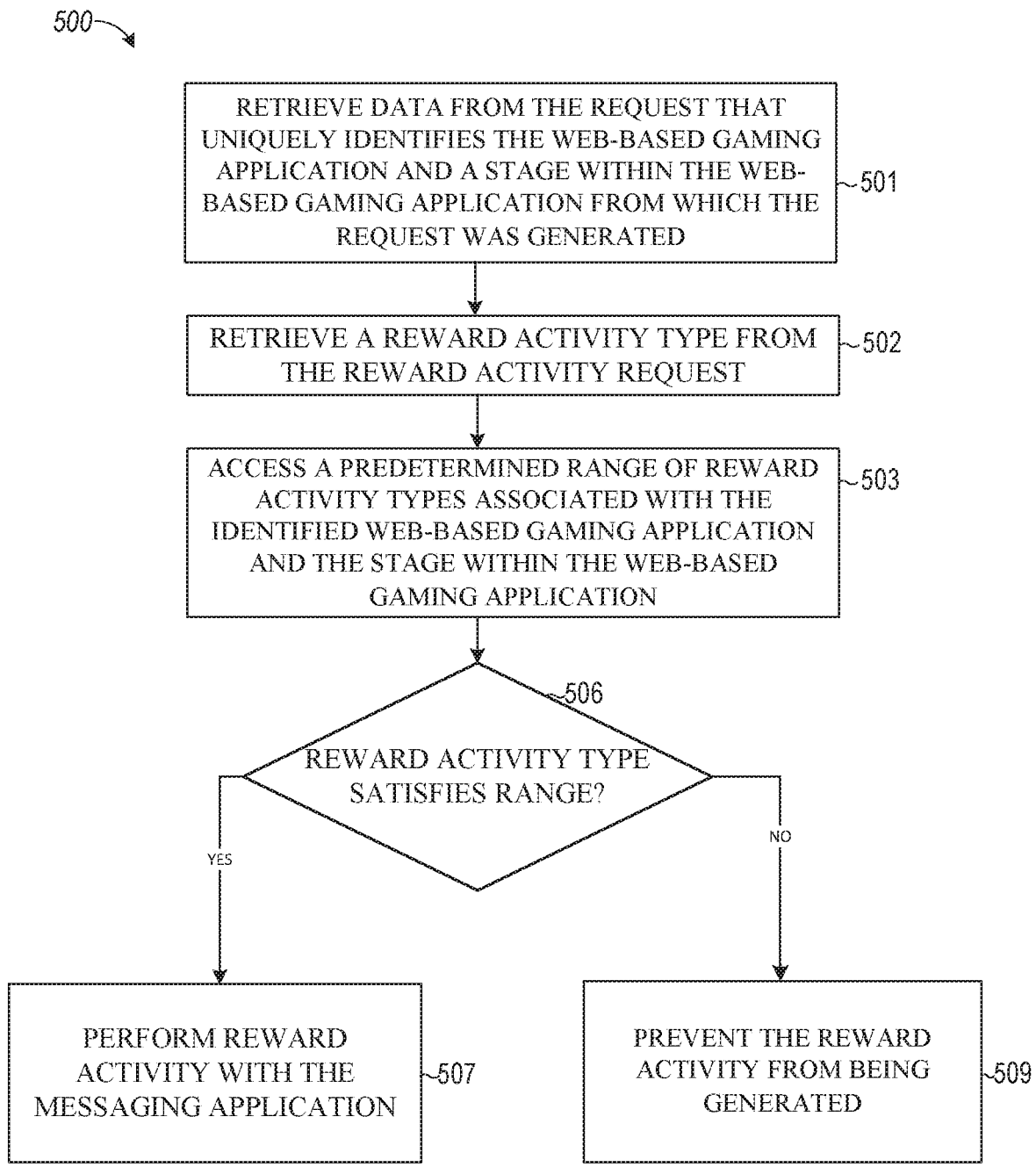
Figure 6:
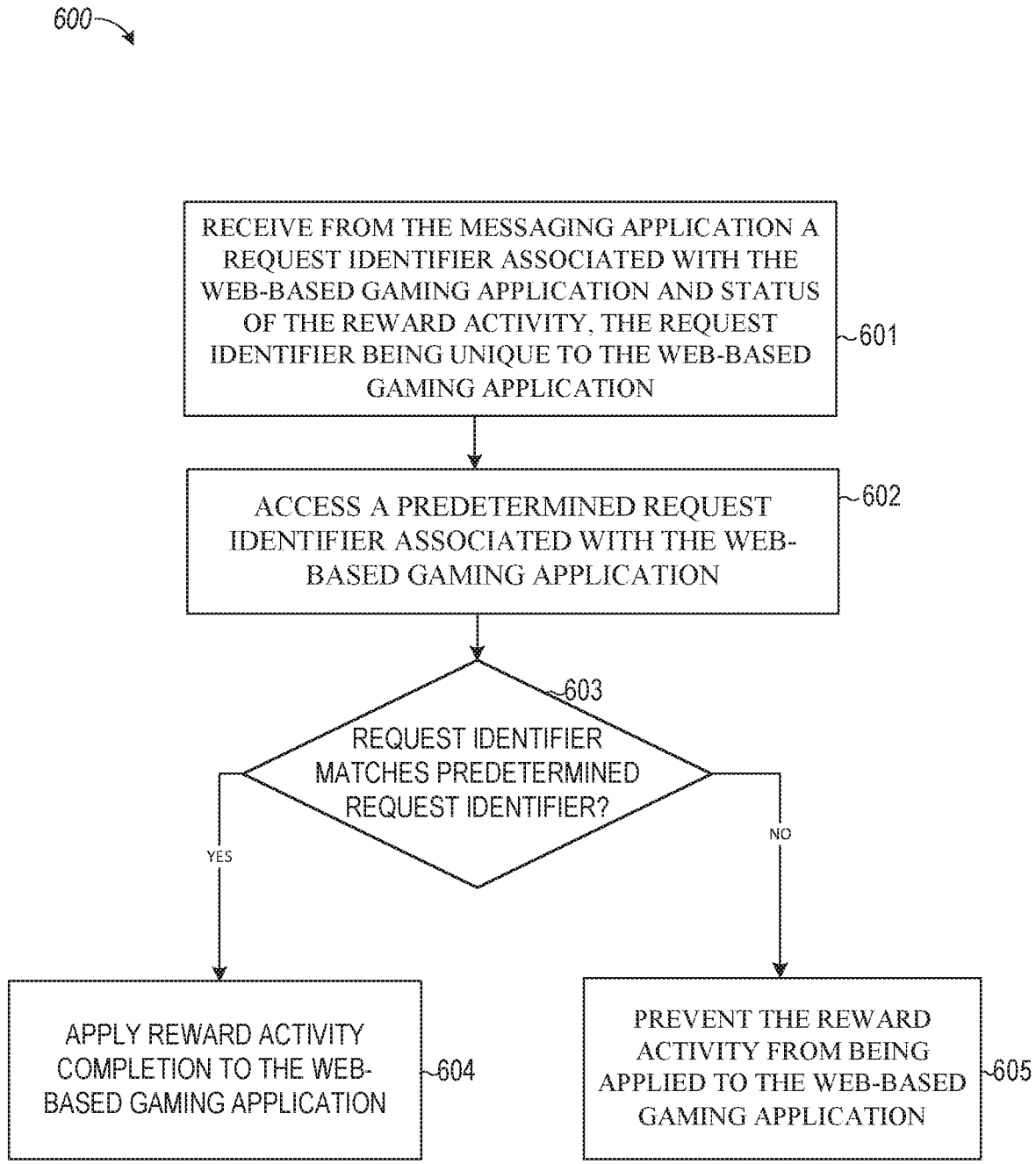

FIGS. 4-6 are flowcharts illustrating example operations of the gaming application platform 124 and other components in performing processes 400-600 for facilitating interactions between a messaging application and a web-based gaming application, according to example embodiments. The processes 400-600 may be embodied in computer-readable instructions for execution by one or more processors such that the operations of the processes 400-600 may be performed in part or in whole by the functional components of the messaging server system 108 or the web-based gaming application server 107; accordingly, the processes 400-600 are described below by way of example with reference thereto. However, in other embodiments, at least some of the operations of the processes 400-600 may be deployed on various other hardware configurations. The processes 400-600 are therefore not intended to be limited to the messaging server system 108.

The process 400 may be performed by the gaming application platform 124 and/or reward activities system 125 to securely provide a reward activity from a messaging application to a web-based gaming application. At operation 401, the gaming application platform 124 provides a platform that facilitates communication between a messaging application and a web-based gaming application. For example, the gaming application platform 124 may store an SDK with various API functions that enable a web-based gaming application implemented on the web-based gaming application server 107 to access and integrate a feature of the messaging client application 104. A game developer may access the SDK by downloading the SDK from the gaming application platform 124 and installing the functions of the SDK in the code for the game. Various functions of the SDK can be invoked in the code for the game to integrate various features of the messaging application (e.g., a voice party, a chat interface, a leaderboard, etc.). Similarly, functions of the SDK can be invoked by the messaging client application 104 to provide one or more features to a given web-based gaming application.

At operation 402, the gaming application platform 124 receives via the platform a request from the web-based gaming application to execute a reward activity. The gaming application platform 124 provides the request to the reward activities system 125. For example, a user playing a web-based gaming application may select an icon in a graphical user interface requesting to participate in a given reward activity (e.g., requesting to purchase a virtual good using virtual currency and/or requesting to upgrade an item in the game by watching an advertisement or completing a reward survey).

At operation 404, the reward activities system 125 determines that the request satisfies a reward activity criterion. For example, the reward activities system 125 retrieves a unique identifier of the web-based gaming application from the received request, and the stage or level from which the request was received in the gaming application. The reward activities system 125 searches a database to identify the range of reward activities associated with the stage or level within the gaming application associated with the unique identifier. For example, the reward activities system 125 identifies the list of available purchase amounts and/or minimum and maximum ranges of purchase amounts for the particular stage or level within the game. As another example, the reward activities system 125 identifies a number and/or types of advertisements associated with the particular stage or level within the game. The reward activities system 125 compares the requested reward activity received in the request with the identified range of reward activities to determine whether the requested reward activity is within the range. For example, the reward activities system 125 determines whether the requested amount of virtual funds matches the purchase amounts available for the particular stage of the game. If so, the reward activities system 125 determines that the request satisfies the reward activity criterion.

At operation 406, the reward activities system 125 generates the reward activity in response to receiving the request from the web-based gaming application. For example, the reward activities system 125 presents one or more advertisements or surveys (specified in the reward activity request) to the user and/or deducts the specified amount of funds from a virtual wallet maintained by the reward activities system 125. The reward activities system 125 monitors user activity while the reward activity is generated to determine whether the reward activity is successfully completed.

At operation 408, the gaming application platform 124 communicates, via the platform, status of the reward activity from the messaging application to the web-based gaming application. For example, the gaming application platform 124 transmits a message back to the web-based gaming application informing the web-based gaming application of the status of completion of the reward activity (e.g., whether the funds were successfully withdrawn from the virtual wallet and/or whether the advertisements were viewed to completion).

The process 500 may be performed by the reward activities system 125 to determine whether the reward activity request received from the web-based gaming application is valid or satisfies a reward activity criterion. At operation 501, the reward activities system 125 retrieves data from the request that uniquely identifies the web-based gaming application and a stage within the web-based gaming application from which the request was generated.

At operation 502, the reward activities system 125 retrieves a reward activity type from the reward activity request. For example, the reward activities system 125 retrieves a specified amount of virtual currency to deduct from a virtual wallet specified in the received reward activity request. As another example, the reward activities system 125 retrieves a specified number and/or types of reward video advertisements, reward surveys, reward text, and/or reward images specified in the received reward activity request.

At operation 503, the reward activities system 125 accesses a predetermined range of reward activity types associated with the identified web-based gaming application and the stage within the web-based gaming application. For example, the reward activities system 125 retrieves from the gaming application(s) data 207 the list of reward activity types specified by the game developer for the particular stage or level of the gaming application.

At operation 506, the reward activities system 125 determines whether the reward activity type satisfies the range. In response to determining that the reward activity type satisfies the range, the process 500 proceeds to operation 507; otherwise, the process 500 proceeds to operation 509.

At operation 507, the reward activities system 125 performs the reward activity with the messaging application. For example, the reward activities system 125 presents one or more advertisements or surveys (specified in the reward activity request) to the user and/or deducts the specified amount of funds from a virtual wallet maintained by the reward activities system 125. The reward activities system 125 monitors user activity while the reward activity is generated to determine whether the reward activity is successfully completed.

At operation 509, the reward activities system 125 prevents the reward activity from being generated or performed. For example, the reward activities system 125 transmits a message back to the web-based gaming application indicating that the reward activity was not successfully completed.

The process 600 may be performed by the web-based gaming application server 107 or web-based gaming application to determine whether the reward activity status received from the gaming application platform 124 is valid or satisfies a reward activity status criterion. At operation 601, the web-based gaming application server 107 receives from the messaging application a request identifier associated with the web-based gaming application and a status of the reward activity, the request identifier being unique to the web-based gaming application.

At operation 602, the web-based gaming application server 107 accesses a predetermined request identifier associated with the web-based gaming application. For example, the web-based gaming application retrieves from the gaming application(s) data 207 the expected reward activity completion request identifier that is uniquely associated with the web-based gaming application.

At operation 603, the web-based gaming application server 107 determines whether the received request identifier matches the predetermined request identifier. In response to determining that the received request identifier matches the predetermined request identifier, the process 600 proceeds to operation 604; otherwise, the process 600 proceeds to operation 605.

At operation 604, the web-based gaming application server 107 applies the reward activity completion to the web-based gaming application. For example, the web-based gaming application provides the user with the requested virtual goods, enables enhancements associated with completion of the specified reward activity, and/or advances the user in the game by a factor associated with completion of the specified reward activity.

At operation 605, the web-based gaming application server 107 prevents the reward activity from being applied to the web-based gaming application.

Figure 7:
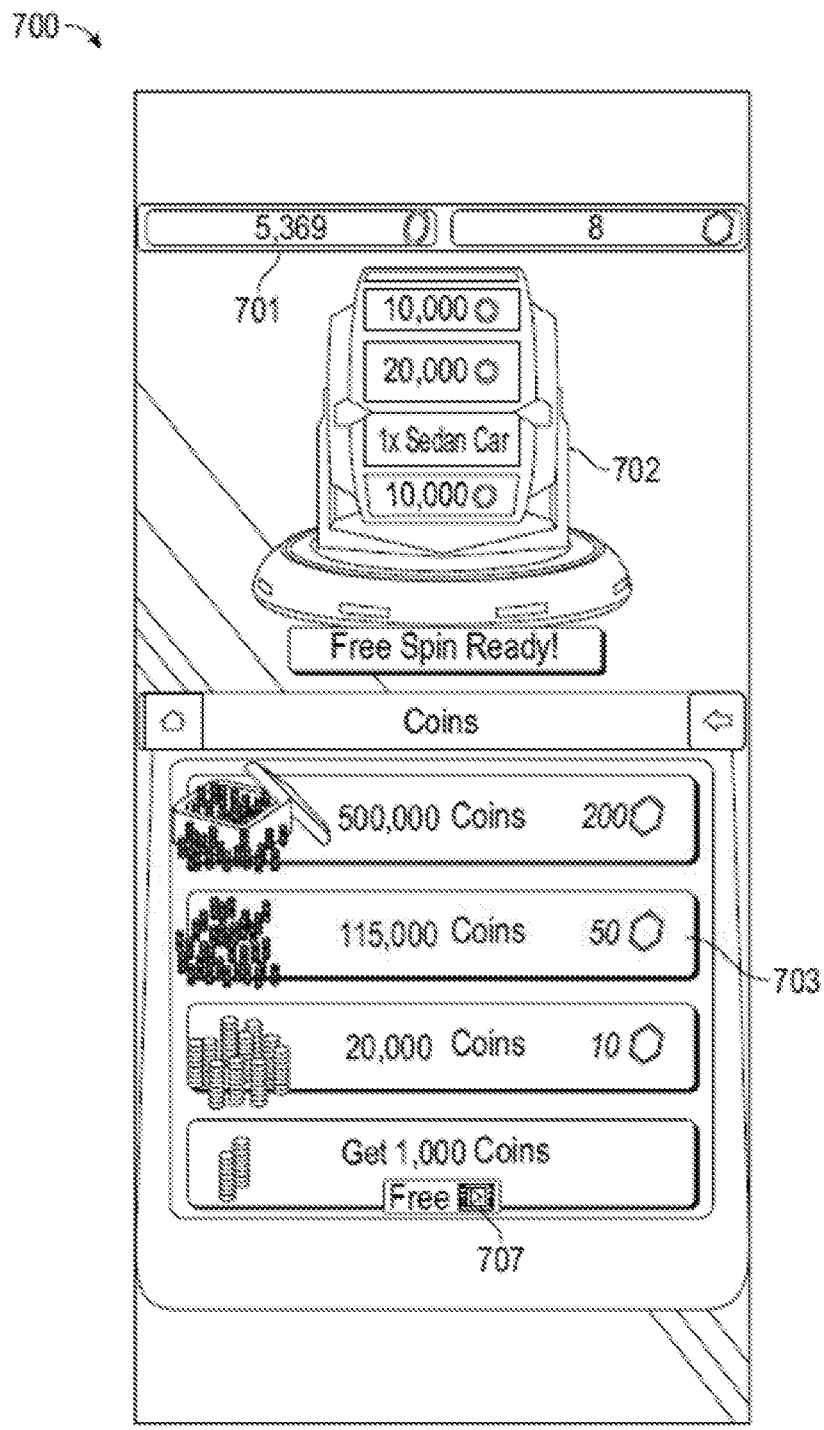
FIG. 7 shows an example graphical user interface that provides an option for a user to participate in a reward activity, according to example embodiments.

FIG. 7 shows an example graphical user interface 700 that provides an option for a user to participate in a reward activity in order to obtain compensation, be it monetary, virtual currency, or enhanced features of a web-based gaming application. The graphical user interface 700 may be presented to the user in response to the user selecting an option to participate in a reward activity in a web-based gaming application. Specifically, the web-based gaming application may present a user, at a particular level or stage in the game, with an option to purchase an item for a certain amount of virtual currency or upon completing a certain reward activity. In response to receiving a user selection of the option, the web-based gaming application communicates to the reward activities system 125 (e.g., via the SDK of the gaming application platform 124) a reward activity request that identifies the web-based gaming application, the stage or level of the web-based gaming application from which the reward activity request was generated, and the specified amount of virtual currency or reward activity. The reward activities system 125 may retrieve the list of available reward activities or ranges of reward activities for the particular stage or level associated with the web-based gaming application. The reward activities system 125 may determine whether the requested reward activity matches or satisfies the list or range of available reward activities for the stage or level in the game. In response to determining that the requested reward activity matches or satisfies the list or range of reward activities, the reward activities system 125 presents the graphical user interface 700 to complete the reward activity.

The graphical user interface 700 may include a virtual currency amount 701 currently available in a user's virtual currency wallet. As part of completing the reward activity, the user may tap the virtual currency amount 701 to confirm or instruct the reward activities system 125 to deduct from the virtual currency amount 701 the requested reward activity amount specified in the reward activity request received from the web-based gaming application. The graphical user interface 700 may also present a reward wheel 702 allowing the user to complete a reward activity of spinning a wheel.

The reward wheel 702, once spun, will provide the user with the reward activity amount specified where the wheel stops. For example, if the reward wheel 702 is spun and stops at 20,000 coins, the user's virtual currency amount 701 may increase by 20,000 coins, and/or the 20.000 coins amount may be provided back to the web-based gaming application as the completed reward activity. The user can then spend that amount within the web-based gaming application to upgrade items, purchase items, receive enhancements, or skip levels.

The graphical user interface 700 includes a purchase virtual currency amount option 703. In response to receiving a user selection of the option 703, another form of currency (e.g., virtual currency maintained by a different application and/or a real-world currency from a user's bank account) is exchanged for the specified amount of virtual currency (e.g., 115,000 coins), and the virtual currency amount 701 is increased by the specified amount. The purchased currency or a portion thereof may be provided back to the web-based gaming application as the completed reward activity. The user can then spend that amount within the web-based gaming application to upgrade items, purchase items, receive enhancements, or skip levels.

The graphical user interface 700 includes a watch reward video option 707. In response to a user selection of the option 707, one or more reward videos are presented to the user, and the virtual currency amount 701 is increased by a specified amount (e.g., 1,000 coins). The specified virtual currency amount may alternatively be provided back to the web-based gaming application as the completed reward activity. The user can then spend that amount within the web-based gaming application to upgrade items, purchase items, receive enhancements, or skip levels.

The user can select a user interface control within the web-based gaming application to participate in a reward activity (e.g., of the social network or messaging client application 104), and in return, be provided with virtual currency or advancement, or enablement of a feature in the web-based gaming application. The user watches an advertisement within the messaging client application 104 or the web-based gaming application. When the viewing activity is complete, control returns to the web-based gaming application, which can confirm the grant of virtual currency or advancement, or enablement of a feature in the web-based gaming application.

Figure 8:
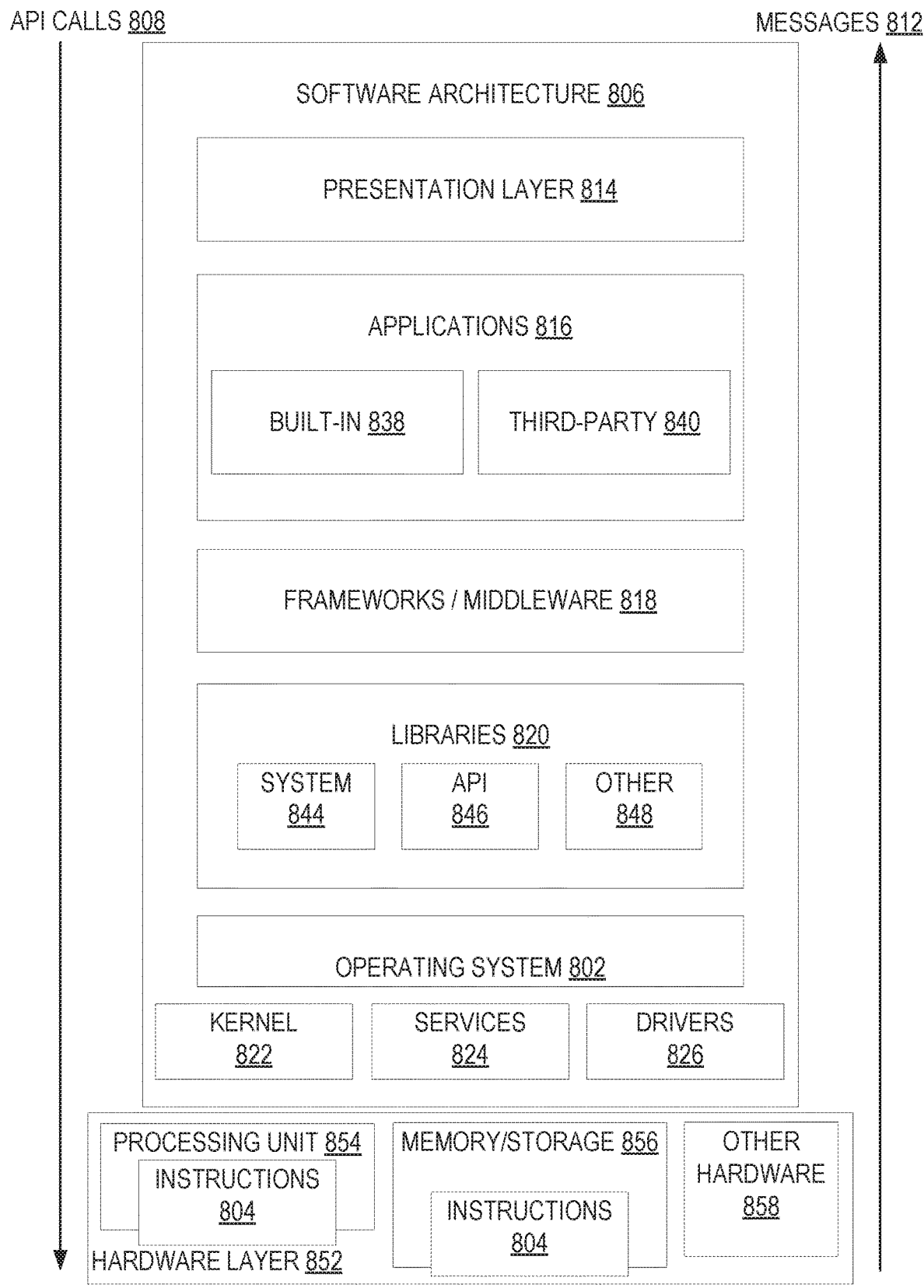
FIG. 8 is a block diagram illustrating a representative software architecture, which may be used in conjunction with various hardware architectures herein described, according to example embodiments.

FIG. 8 is a block diagram illustrating an example software architecture 806, which may be used in conjunction with various hardware architectures herein described. FIG. 8 is a non-limiting example of a software architecture 806, and it will be appreciated that many other architectures may be implemented to facilitate the functionality described herein. The software architecture 806 may execute on hardware such as a machine 900 of FIG. 9 that includes, among other things, processors 904, memory 914, and input/output (I/O) components 918. A representative hardware layer 852 is illustrated and can represent, for example, the machine 900 of FIG. 9. The representative hardware layer 852 includes a processing unit 854 having associated executable instructions 804. The executable instructions 804 represent the executable instructions of the software architecture 806, including implementation of the methods, components, and so forth described herein. The hardware layer 852 also includes memory and/or storage modules memory/storage 856, which also have the executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive messages 812 in response to the API calls 808. The layers illustrated are representative in nature, and not all software architectures have all layers. For example, some mobile or special-purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers. Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than by interfacing directly with the underlying operating system 802 functionality (e.g., kernel 822, services 824, and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media formats such as MPEG4. H.264, MP3. AAC, AMR, JPG, and PNG), graphics libraries (e.g., an OpenGL framework that may be used to render two-dimensional and three-dimensional graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 provide a higher-level common infrastructure that may be used by the applications 816 and/or other software components/modules. For example, the frameworks/middleware 818 may provide various graphic UI (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. The third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS@ Phone, or other mobile operating systems. The third-party applications 840 may invoke the API calls 808 provided by the mobile operating system (such as the operating system 802) to facilitate functionality described herein.

The applications 816 may use built-in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as the presentation layer 814. In these systems, the application/component "logic" can be separated from the aspects of the application/component that interact with a user.

Figure 9:
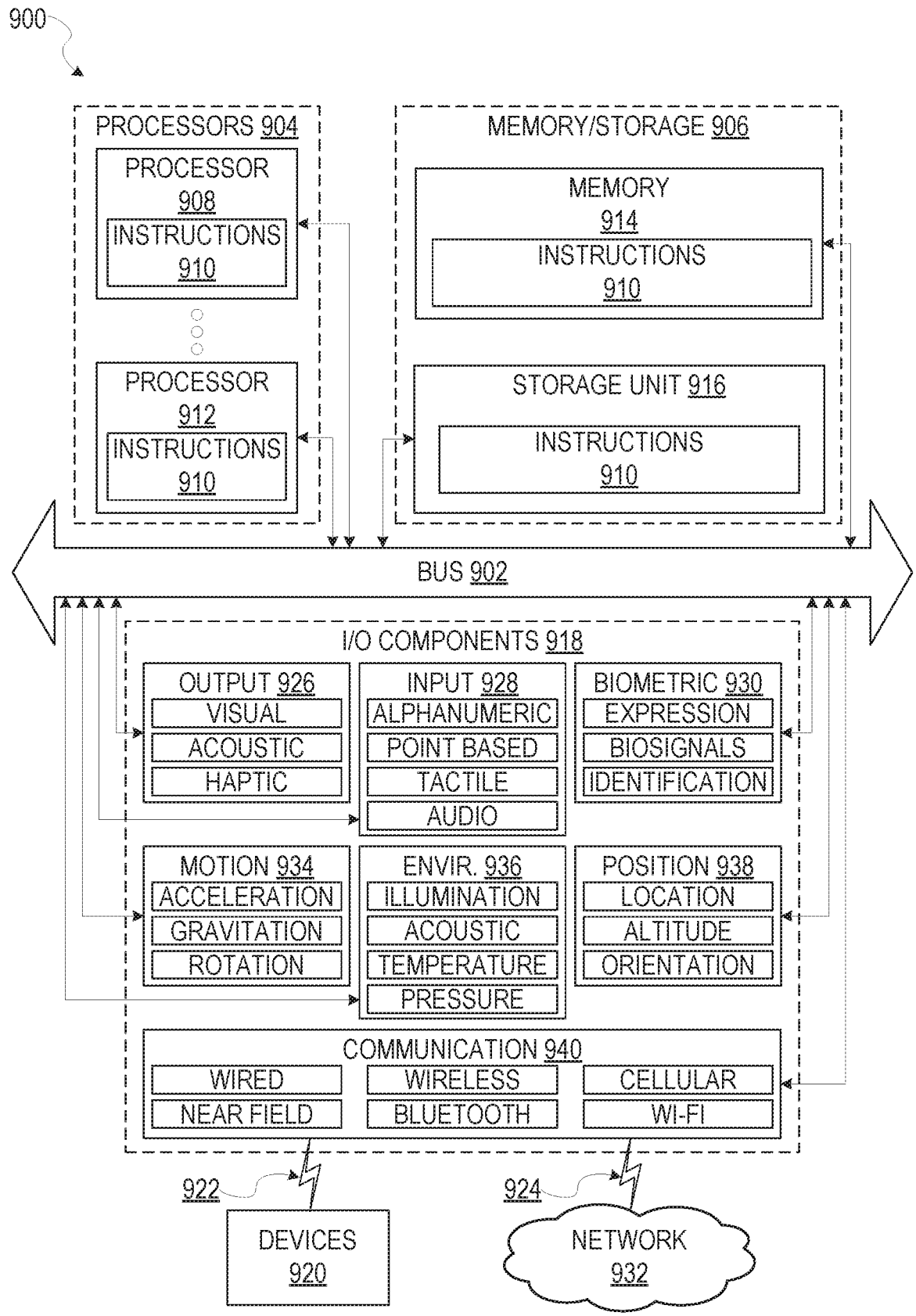
FIG. 9 is a block diagram illustrating components of a machine able to read instructions from a machine-readable medium (e.g., a machine-readable storage medium) and perform any one or more of the methodologies discussed herein, according to example embodiments.

FIG. 9 is a block diagram illustrating components of a machine 900, according to some example embodiments, able to read instructions 910 from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. In an example embodiment, the processors 904 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 908 and a processor 912 that may execute the instructions 910. The term "processor" is intended to include multi-core processors 904 that may comprise two or more independent processors 908, 912 (sometimes referred to as "cores") that may execute the instructions 910 contemporaneously. Although FIG. 9 shows multiple processors 904, the machine 900 may include a single processor with a single core, a single processor with multiple cores (e.g., a multi-core processor), multiple processors with a single core, multiple processors with multiple cores, or any combination thereof.

The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of the processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine 900. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion, and the grouping is in no way limiting. In various example embodiments, the I/O components 918 may include output components 926 and input components 928. The output components 926 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via a coupling 924 and a coupling 922, respectively. For example, the communication components 940 may include a network interface component or other suitable device to interface with the network 932. In further examples, the communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code. Aztec code, Data Matrix, Dataglyph, MaxiCode, PDF417, Ultra Code. UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying transitory or non-transitory instructions 910 for execution by the machine 900, and includes digital or analog communications signals or other intangible media to facilitate communication of such instructions 910. The instructions 910 may be transmitted or received over the network 932 using a transitory or non-transitory transmission medium via a network interface device and using any one of a number of well-known transfer protocols.

"CLIENT DEVICE" in this context refers to any machine 900 that interfaces to a communications network 932 to obtain resources from one or more server systems or other client devices 102. A client device 102 may be, but is not limited to, a mobile phone, desktop computer, laptop, PDA, smart phone, tablet, ultra book, netbook, laptop, multi-processor system, microprocessor-based or programmable consumer electronic system, game console, set-top box, or any other communication device that a user may use to access a network 932.

"COMMUNICATIONS NETWORK" in this context refers to one or more portions of a network 932 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi@ network, another type of network, or a combination of two or more such networks 106. For example, a network 106 or a portion of a network 106 may include a wireless or cellular network, and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS). High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message 300 that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message 300 is transitory.

"MACHINE-READABLE MEDIUM" in this context refers to a component, device, or other tangible medium able to store the instructions 910 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store the instructions 910. The term "machine-readable medium" shall also be taken to include any medium, or combination of multiple media, that is capable of storing the instructions 910 (e.g., code) for execution by the machine 900, such that the instructions 910, when executed by one or more processors 904 of the machine 900, cause the machine 900 to perform any one or more of the methodologies described herein. Accordingly, "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points. APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 904 or other programmable processor 904. Once configured by such software, hardware components become specific machines (or specific components of a machine 900) uniquely tailored to perform the configured functions and are no longer general-purpose processors 904. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor 904 configured by software to become a special-purpose processor, the general-purpose processor 904 may be configured as respectively different special-purpose processors (e.g., comprising different hardware components) at different times. Software accordingly configures a particular processor or processors 904, for example, to constitute a particular hardware component at one instant of time and to constitute a different hardware component at a different instant of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 902) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 932 (e.g., the Internet) and via one or more appropriate interfaces (e.g., an API). The performance of certain of the operations may be distributed among the processors 904, not only residing within a single machine 900, but deployed across a number of machines 900. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR" in this context refers to any circuit or virtual circuit (a physical circuit emulated by logic executing on an actual processor 904) that manipulates data values according to control signals (e.g., "commands," "op codes," "machine code," etc.) and which produces corresponding output signals that are applied to operate a machine 900. A processor 904 may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 904 may further be a multi-core processor 904 having two or more independent processors (sometimes referred to as "cores") that may execute instructions 910 contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
providing, by one or more processors, a platform that facilitates communication between a messaging application and a web-based gaming application;
receiving, by the one or more processors, via the platform by the messaging application, a request from the web-based gaming application to execute a reward activity, the request being generated by the web-based gaming application in response to a selection of an item to purchase, the item being associated with virtual currency amount, the request specifying the virtual currency amount;
crediting a virtual wallet, maintained by the messaging application, with a specified quantity of virtual currency in response to determining that a first plurality of reward videos have been consumed using the messaging application;
receiving, by the messaging application from the web-based gaming application, a communication that identifies a stage within the web-based gaming application from which the request to execute the reward activity was generated;
determining, by the messaging application, that the request satisfies a reward activity criterion, the determining comprising:
obtaining, by the messaging application, a set of spending limits associated with the web-based gaming application based on the received communication that identifies the stage within the web-based gaming application; and
comparing the virtual currency amount specified in the request received from the web-based gaming application to the set of spending limits;
in response to determining that the virtual currency amount specified in the request received from the web-based gaming application corresponds to the set of spending limits associated with the stage of the web-based gaming application, generating, by the one or more processors, the reward activity on the messaging application in response to receiving the request using the virtual wallet; and
communicating, by the one or more processors, via the platform, a status of the reward activity from the messaging application to the web-based gaming application, the status comprising a confirmation message that enables the web-based gaming application to complete the purchase of the item.

2. The method of claim 1 further comprising prior to launching, via the platform, the web-based gaming application from the messaging application:
receiving, from a developer of the web-based gaming application, registration and configuration information of one or more items available for purchase within the web-based gaming application, wherein a plurality of attributes are specified for each of the one or more items in the registration and configuration information, wherein the plurality of attributes comprises: an enabled/disabled indication that controls whether a respective item of the one or more items is currently available for sale; an icon asset indication, which provides an icon to be used to represent the respective item; a title to be used to represent the respective item; a short description to be used to represent the respective item; an item identifier to be used to represent the respective item; a price tier indication, which defines a pricing tier for the respective item; a countries enabled indication, which indicates which countries are enabled or disabled for the respective item; localized languages, including localization options for a predefined list of supported languages associated with the respective item; a language-specific translated title for a selected language to be used to represent the respective item; a country-specific description for a selected language to be used to represent the respective item; and an item version number, which increments with every update for the represent the respective item.

3. The method of claim 2 further comprising:
comparing the request to execute the reward activity to a combination of the plurality of attributes to determine that the request satisfies a reward activity criterion; and
monitoring user input during the reward activity.

4. The method of claim 3, wherein the monitoring of the user input comprises monitoring whether user input was received canceling the reward activity, skipping the reward activity, or iconizing a window displaying the reward activity.

5. The method of claim 1, further comprising:
receiving a request from a conversation participant to launch the web-based gaming application, the conversation comprising a plurality of participants; and
determining, in response to receiving the request to launch the web-based gaming application, whether a maximum number of players associated with the web-based gaming application is greater than a total number of the plurality of participants of the conversation.

6. The method of claim 1 further comprising detecting completion status of the reward activity with the messaging application.

7. The method of claim 6, wherein communicating the status comprises transmitting a reward message that confirms successful deduction of virtual currency from a virtual currency account.

8. The method of claim 1, wherein providing the platform comprises:
storing an application programming interface (API), associated with the messaging application, on a server; and
establishing, via a JavaScript bridge, two one-way asynchronous communication channels between the messaging application and the web-based gaming application, wherein functions of the API, invoked by the web-based gaming application or the messaging application, are transmitted as messages over the asynchronous communication channels.

9. The method of claim 1 further comprising:
providing an authentication token to the web-based gaming application via the platform in response to receiving a request for the authentication token from the web-based gaming application via the platform, wherein the authentication token expires after a prespecified period of time; and
processing gaming data by the web-based gaming application using the authentication token.

10. The method of claim 1, wherein the stage of the web-based gaming application is associated with the first plurality of reward videos that a user can consume to receive a specified quantity of virtual currency, further comprising:
receiving a request to consume the first plurality of reward videos; and
presenting the first plurality of reward videos in response to the request to consume the first plurality of reward videos.

11. The method of claim 1, further comprising:
receiving, via the platform, by the messaging application from the web-based gaming application, a reward video request;
in response to receiving the reward video request, causing the messaging application to select a reward video; and
transmitting, via the platform, to the web-based gaming application, an indication of consumption of the reward video.

12. The method of claim 11, further comprising distributing multiple levels of security associated with reward activities across the messaging application and the web-based gaming application, wherein a first level of the multiple levels of security comprises a verification by the messaging application that a particular request for reward activity satisfies the reward criterion for the web-based gaming application, and wherein a second of the multiple levels of security comprises a verification by the web-based gaming application that a unique identifier of the particular request, received by the web-based gaming application from the messaging application, corresponds to an expected unique identifier stored in a remote database, the distributed multiple levels of security preventing tampering with a reward system of the messaging application and the web-based gaming application.

13. The method of claim 12 further comprising:
retrieving a reward activity type from the request;
accessing a predetermined range of reward activity types associated with the identified web-based gaming application and the stage within the web-based gaming application; and
determining that the reward activity type is included within the range of reward activity types.

14. The method of claim 12 further comprising:
determining that the request fails to satisfy the reward activity criterion;
preventing the reward activity from being generated in response to determining that the request fails to satisfy the reward activity criterion; and
communicating as the status an indication that the request fails to satisfy the reward activity criterion.

15. The method of claim 1, wherein the request comprises an instruction to the messaging application to deduct the virtual currency amount associated with the item from a virtual wallet maintained by the messaging application, the virtual wallet comprising virtual currency a user can spend on different web-based gaming applications and within the messaging application.

16. The method of claim 1, further comprising:
associating a first level of the web-based gaming application with a first amount or range of a virtual currency spending limit;
associating a second level of the web-based gaming application with a second amount or range of a virtual currency spending limit;
determining, based on the request, a current level of the web-based gaming application from which the request was generated;
determining that the current level matches the second level of the web-based gaming application; and
in response to determining that the current level matches the second level of the web-based gaming application, obtaining the second amount or range of a virtual currency spending limit as the set of spending limits.

17. The method of claim 1 further comprising determining, by the web-based gaming application, that the status of the reward activity satisfies a reward activity completion criterion by, in response to receiving the status from the messaging application, verifying by the web-based gaming application that a unique identifier of the request, received in the communication of the status, to execute the reward activity matches an expected unique identifier that is stored on a remote database.

18. The method of claim 1, further comprising:
deducting, by the messaging application, the virtual currency amount associated with the item from a virtual wallet;
in response to successfully deducting the virtual currency amount associated with the item from a virtual wallet, generating, by the messaging application, the confirmation message that includes a unique identifier of the web-based gaming application;
in response to receiving from the messaging application the confirmation message that includes the unique identifier of the web-based gaming application, determining, by the web-based gaming application, that the unique identifier matches a predetermined identifier, stored on a remote database, associated with the web-based gaming application; and
in response to determining that the unique identifier, received in a confirmation message from the messaging application, matches the predetermined identifier associated with the web-based gaming application, completing the purchase of the item.

19. A system comprising:
a processor configured to perform operations comprising:
providing a platform that facilitates communication between a messaging application and a web-based gaming application;
receiving, via the platform by the messaging application, a request from the web-based gaming application to execute a reward activity, the request being generated by the web-based gaming application in response to a selection of an item to purchase, the item being associated with virtual currency amount, the request specifying the virtual currency amount;
crediting a virtual wallet, maintained by the messaging application, with a specified quantity of virtual currency in response to determining that a first plurality of reward videos have been consumed using the messaging application;
receiving, by the messaging application from the web-based gaming application, a communication that identifies a stage within the web-based gaming application from which the request to execute the reward activity was generated;
determining, by the messaging application, that the request satisfies a reward activity criterion, the determining comprising:
obtaining, by the messaging application, a set of spending limits associated with the web-based gaming application based on the received communication that identifies the stage within the web-based gaming application; and
comparing the virtual currency amount specified in the request received from the web-based gaming application to the set of spending limits;
in response to determining that the virtual currency amount specified in the request received from the web-based gaming application corresponds to the set of spending limits associated with the stage of the web-based gaming application, generating the reward activity on the messaging application in response to receiving the request; and
communicating, via the platform, a status of the reward activity from the messaging application to the web-based gaming application, the status comprising a confirmation message that enables the web-based gaming application to complete the purchase of the item.

20. A non-transitory machine-readable storage medium that includes instructions that, when executed by one or more processors of a machine, cause the machine to perform operations comprising:
providing a platform that facilitates communication between a messaging application and a web-based gaming application;
receiving, via the platform by the messaging application, a request from the web-based gaming application to execute a reward activity, the request being generated by the web-based gaming application in response to a selection of an item to purchase, the item being associated with virtual currency amount, the request specifying the virtual currency amount;
crediting a virtual wallet, maintained by the messaging application, with a specified quantity of virtual currency in response to determining that a first plurality of reward videos have been consumed using the messaging application;
receiving, by the messaging application from the web-based gaming application, a communication that identifies a stage within the web-based gaming application from which the request to execute the reward activity was generated;
determining, by the messaging application, that the request satisfies a reward activity criterion, the determining comprising:
obtaining, by the messaging application, a set of spending limits associated with the web-based gaming application based on the received communication that identifies the stage within the web-based gaming application; and
comparing the virtual currency amount specified in the request received from the web-based gaming application to the set of spending limits;
in response to determining that the virtual currency amount specified in the request received from the web-based gaming application corresponds to the set of spending limits associated with the stage of the web-based gaming application, generating the reward activity on the messaging application in response to receiving the request; and communicating, via the platform, a status of the reward activity from the messaging application to the web-based gaming application, the status comprising a confirmation message that enables the web-based gaming application to complete the purchase of the item.

* * * * *